May 30, 1933.     P. S. MARTIN     1,912,085
POULTRY ROOST
Filed Oct. 24, 1928
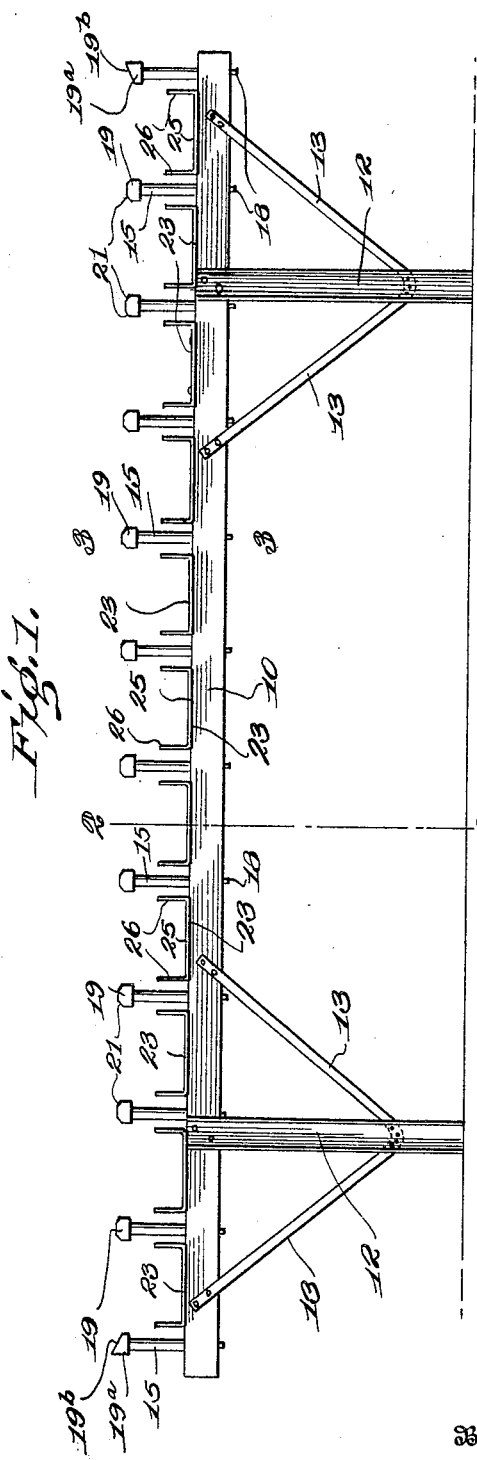
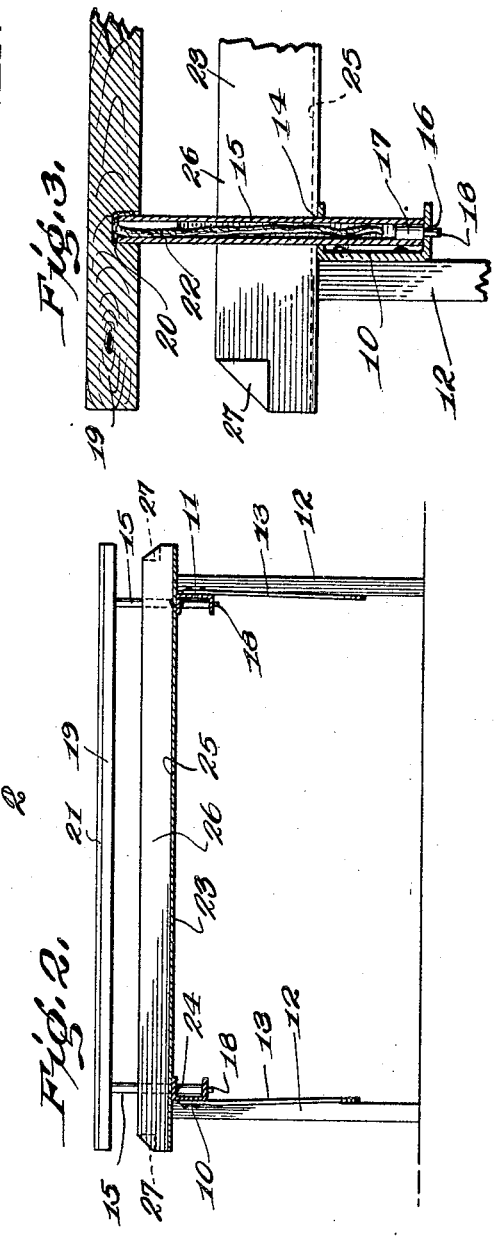
Inventor
Perry S. Martin
By R. W. Hoagland
Attorney Patented May 30, 1933

1,912,085

UNITED STATES PATENT OFFICE

PERRY S. MARTIN, OF HARRISONBURG, VIRGINIA

POULTRY ROOST

Application filed October 24, 1928. Serial No. 314,731.

This invention relates to a poultry roost, and aims to provide a novel and improved device of this character having a plurality of roost bars supported above a main frame, and a series of pans also supported by the frame below the roost bars for receiving droppings from fowls perched upon the roost bars.

Another object of the invention is to provide roost bars with a series of pans arranged at predetermined points below and between the roost bars and being spaced sufficient distances apart to provide air passageways between the pans, directly below the roost bars for permitting fresh air beneath the pans to be drawn upwardly between the latter by the body temperature of fowls perched on the roost bars without said air first passing over the pans.

A further object of the invention is the provision of a plurality of elongated pans for a poultry roost arranged at suitable points for receiving droppings from fowls, said pans being substantially U-shaped in cross section for providing a bottom wall and a pair of oppositely arranged side walls, thus permitting convenient cleaning of the pans with the use of a scraping element, such as a hoe or the like.

Another object of the invention is to construct the end roost bars with their upper surfaces inclined away from the roost for permitting comfortable perching of fowls thereon only when facing away from the roost, in order that pans will be arranged under the fowls for catching droppings.

A still further object of the invention is to provide a main frame carrying a series of roost supporting members arranged in the form of reservoirs for containing an insecticide liquid to be fed to the roost bars by means of wicks or the like partially submerged in the liquid and engaging the roost bars, thus treating or disinfecting the roost bars.

Another object of the invention is to provide a frame constructed with oppositely arranged side members for detachably supporting upstanding posts which, in turn, support upon their upper ends roost bars, which are also detachably carried by the posts.

It is also an object of the invention to provide a device of the above indicated character which is simple and substantial in construction, which can be manufactured economically and which will be thoroughly efficient and practical in use.

With the foregoing and other objects in view that will appear as the nature of my invention is better understood, the same consists in the novel features of construction, combination and arrangement of parts illustrated in the accompanying drawing and more particularly pointed out in the appended claims.

In the accompanying drawing, which is for illustrative purposes only and are therefore not drawn to scale:

Figure 1 is a side elevation of a poultry roost construction in accordance with my invention;

Figure 2 is a vertical transverse section, taken on the line 2—2 of Figure 1; and Figure 3 is a similar view, taken on the line 3—3 of Figure 1.

In carrying out the invention, the numerals 10 and 11 designate a pair of spaced parallel side members of U-shape angle construction with the parallel spaced side walls arranged one above another and the bight portions arranged to the sides. Adjacent the ends of the side members 10 and 11 are legs 12 which have their upper ends attached to said side members while their lower ends engage the floor of a chicken house or the like. The legs 12 are also connected to the side members 10 and 11, by means of braces 13.

The upper side portions of the U-shaped side members 10 are provided at spaced intervals with openings 14 for receiving tubular supporting members 15, while the lower side portions of the U-shaped side members 10 and 11 are provided with openings 16 directly beneath the openings 14 and of less size than said openings 14. The lower ends of the tubular supporting members 15 are closed by plugs 17, which carry depending pins 18 that extend through the openings 16. From the foregoing, it can be seen that the tubular supporting members 15 are limited against downward sliding movement, due to the lower ends thereof engaging the lower side walls of the U-shaped side members 10 and 11.

Supported upon the upper ends of the tubular members 15 are roost bars 19, which have openings 20 extending upwardly therein from their lower sides, said openings being adapted to receive the upper ends of the tubular supporting members 15. By referring to Figure 2 of the drawing, it can be seen that a tubular supporting member 15 carried by one side member 10 or 11 supports one end of a roost bar, while another tubular supporting member 15 carried by the other side member supports the opposite end of the same roost bar.

The upper edges of the roost bar 19 with exception of the end roost bar 19$^a$ are bevelled as at 21, in order that fowls may perch comfortable thereon and face in either direction. The end roost bars 19$^a$ are provided with angular upper surfaces as the 19$^b$, inclined away from the roost so as to aid in causing fowls to perch thereon facing away from the roost.

By having the plugs 17 arranged in the lower ends of the tubular members 15, said tubular members 15 form reservoirs for containing an insecticide liquid, which is adapted to be fed to the roost bars 19, by means of wicks 22, said wicks 22 having their upper ends extending over the upper ends of the tubular members 15, so as to contact with the roost bars 19 and forming means for causing frictional engagement of the roost bars 19 with the tubular members 15. As the roost bars are constructed of wood or similar material, it can be seen that the same will absorb the insecticide liquid fed thereto by the wicks 22.

Also supported on the side members 10 and 11 are pans 23, which extend across from the side members 10 and 11 and are secured thereto by means of rivets or the like 24. By referring to Figure 1 of the drawing, it can be seen that the pans 23 are supported below and between the roost bars 19 and that said pans are spaced apart so as to permit air to circulate upwardly between the pans and around fowls perched upon the roost bars. The pans 23 are substantially U-shaped in cross section so as to provide bottoms 25 and opposite longitudinal side walls 26. The upper end corners of the side walls 26 may be turned over or bent back, as at 27, so as to eliminate sharp corners at the ends of said longitudinal side walls.

When fowls are perched upon the parallel spaced roost bars 19, it can be seen that air will circulate upwardly between the various pans 23 and around the fowls without passing over the bottom walls 25 of the pans, this being due to the fact that the body temperature of the fowls will cause the cool, fresh air beneath the pans to pass upwardly.

Due to the fact that the end roost bars 19$^a$ have inclined upper surfaces, fowls in order to perch comfortably thereon must face away from the roost with their claws engaging over the high edges of the bars. When in such positions all droppings will fall into the pans 23 adjacent thereto.

By having the pans 23 arranged substantially U-shaped in cross section, it can be seen that the same may be conveniently and efficiently cleaned with a hoe or other scraping element by dragging the same over the bottom walls 25 of said pans toward one end of the pans beneath which may be arranged a receptacle for catching the droppings.

As the tubular supporting members 15 contain an insecticide liquid and the same is fed to the roost bars and absorbed thereby, all lice or other vermin thereon will be destroyed. When it is desired to refill the tubular members 15, the roost bars 19 may be conveniently detached therefrom, thus leaving the upper ends of the tubular members 15 open.

As above stated, the tubular supporting members are carried by the side members 10 and 11 in a manner whereby the same may be conveniently removed during cleaning of the roost or for any other reason desired.

From the foregoing description taken in connection with the drawings, it is thought that the construction, operation and advantages of my invention will be readily understood without requiring a more extended explanation.

Various changes in the form, proportions and minor details of construction may be resorted to without departing from the principles or sacrificing any of the advantages of my invention, as defined in the appended claims.

Having described my invention, what I claim is:

1. A poultry roost comprising roost bars, and pans arranged at spaced points at a lower level than said roost bars, the spaces between the pans being directly beneath said roost bars.

2. A poultry roost comprising a frame, roost bars supported above said frame, and pans arranged on said frame at spaced intervals below and between said roost bars for providing air spaces between the pans directly beneath said roost bars.

3. A poultry roost comprising roost bars, pans arranged at spaced points below and between said roost bars, said pans being arranged in parallel relation to said roost bars for providing air spaces between the pans directly beneath said roost bars, and upstanding flanges arranged on said pans and extending parallel with said roost bars.

4. A poultry roost comprising a frame, roost bars supported by said frame and superposed thereabove, and pans arranged upon said frame at spaced intervals and parallel with said roost bars, each of said pans being below and between two of said roost bars for providing air spaces between the pans directly beneath the roost bars.

5. A poultry roost comprising a frame, a plurality of alternately arranged pans and roost bars on said frame, the roost bars being supported above the level of said pans and directly above the spaces between the pans.

6. A poultry roost comprising a frame, a series of tubular members arranged at each side of the frame and extending thereabove, roost bars carried by the upper ends of said tubular members and wicks arranged in said tubular members and engaging the same and the roost bars to aid in holding the roost bars on said tubular members.

7. A poultry roost comprising a pair of spaced plates at each side thereof, one plate of each pair being arranged above the other plate, said plates having openings arranged therein at spaced intervals, the openings in the uppermost plates being of larger size than the openings in the lowermost plates, tubular members extending through the openings in the uppermost plates and having their lower ends engaging the upper surfaces of the lowermost plates, reduced pins carried by the lower ends of the tubular members and extending into the openings in the lower plates, and roost bars carried by the upper ends of the tubular members.

8. A poultry roost comprising a pair of side members substantially U-shaped in cross section arranged with the opposite parallel portions positioned one above another, said parallel portions having openings arranged at spaced intervals therein, the openings in the uppermost portions being of larger size than the openings in the lowermost portions, tubular members extending through the openings in the uppermost parallel portions, means carried by said tubular members for engaging in the openings in the lowermost parallel portions, and roost bars carried by the upper ends of the tubular members.

9. A poultry roost comprising a frame, a plurality of upstanding tubular members arranged at opposite sides of the frame, means closing the lower ends of said tubular members, roost bars provided with openings therein extending upwardly from the under surface thereof for receiving the upper ends of the tubular members, and fabric members arranged in the tubular members and engaging between the tubular members and the roost bars.

10. A poultry roost comprising a pair of oppositely arranged side members, legs attached at their upper ends to said side members, a plurality of supports carried by each side member, roost bars carried at the upper ends of said supports, pans arranged between said supports and below said roost bars, and means attaching said pans to said side members.

11. A poultry roost comprising roost bars, and pans below and between said roost bars, the roost bars at the sides of the roost having their upper surfaces formed so that fowls perching thereon will be comfortable only when facing away from the roost.

12. A poultry roost comprising a plurality of roost bars arranged in parallel spaced relation, pans arranged parallel with the roost bars and at points below and between the roost bars, the end roost bars having their upper surfaces inclined away from the roost.

13. In combination, a roost bar having a recess therein, a post hollow at one end and fitting loosely said recess, and a member extending from within the hollow of the post, over the top, and down the side of the post to engage the wall of the recess to bind the roost bar to the post.

14. In a poultry roost, a pair of beams, a plurality of spaced pans supported transversely on said beams, and a plurality of roost bars supporting posts rising from the beams between the pans.

15. The device of claim 14 in which the beams are channels with their webs vertical and the posts each fit an opening in the upper flange of the channel and rest upon the lower flange.

16. In a poultry roost, a channel beam with its web in a vertical plane, said channel having a plurality of spaced holes thru its upper flange, and a plurality of roost bar supporting posts extending thru said holes and resting upon the bottom flanges.

17. The device of claim 16 in which the lower flange is recessed in line with the holes in the upper flange and the posts are reduced at their lower ends to fit the recesses whereby the posts are held in parallel relation.

18. The device of claim 16 in which the lower flange is recessed in line with the holes in the upper flange, the posts are tubes and have their bottom ends closed by plugs which plugs extend into the recesses.

19. In combination, spaced supports, spaced channel-shaped pans arranged parallel and bridging the spaced supports, said channel-shaped pans having their webs horizontal and both flanges vertical, and poultry perches parallel to the pans, above the level of the tops of the flanges, and lying entirely between the vertical planes passing thru the outside surfaces of proximate pan flanges.

20. A poultry roost comprising a plurality of roost bars arranged in parallel spaced relation, pans arranged parallel with the roost bars and at points below and between the roost bars, the end roost bars being so shaped as to be comfortable to the foot only when the fowl faces from the roost whereby no pan is necessary on the outside of the last roost bars.

In testimony whereof I affix my signature.

PERRY S. MARTIN.